(12) United States Patent
Liao et al.

(10) Patent No.: US 9,900,256 B2
(45) Date of Patent: Feb. 20, 2018

(54) METHOD AND APPARATUS FOR QUALITY OF EXPERIENCE MANAGEMENT FOR NETWORK SERVICES

(75) Inventors: Ning Liao, Beijing (CN); Zhi Bo Chen, Beijing (CN); Xian Lei Wang, Beijing (CN)

(73) Assignee: Thomson Licensing DTV (FR)

(*) Notice: Subject to any disclaimer, the term of this patent is extended or adjusted under 35 U.S.C. 154(b) by 39 days.

(21) Appl. No.: 13/882,541

(22) PCT Filed: Nov. 1, 2010

(86) PCT No.: PCT/CN2010/001732
§ 371 (c)(1),
(2), (4) Date: Apr. 30, 2013

(87) PCT Pub. No.: WO2012/058781
PCT Pub. Date: May 10, 2012

(65) Prior Publication Data
US 2013/0223208 A1  Aug. 29, 2013

(51) Int. Cl.
*H04L 12/851* (2013.01)
*H04L 12/24* (2006.01)
(Continued)

(52) U.S. Cl.
CPC .......... *H04L 47/24* (2013.01); *H04L 41/5025* (2013.01); *H04L 41/5054* (2013.01);
(Continued)

(58) Field of Classification Search
CPC ... H04L 47/19–47/2491; H04L 67/32–67/322; H04L 67/327; H04L 65/1083–65/1093; H04L 12/2834
(Continued)

(56) References Cited

U.S. PATENT DOCUMENTS

2004/0030797 A1  2/2004 Akinlar et al.
2004/0057420 A1  3/2004 Curcio et al.
(Continued)

FOREIGN PATENT DOCUMENTS

CN    101272575    9/2008
CN    101610493    12/2009
(Continued)

OTHER PUBLICATIONS

Search Report dated Aug. 4, 2011.
(Continued)

*Primary Examiner* — Eric Myers
(74) *Attorney, Agent, or Firm* — Jack Schwartz & Associates, PLLC

(57) ABSTRACT

The present invention provides a QoE (Quality of Experience) management solution, wherein QoE feedback is used to optimize the usage of QoS provisioning techniques, thus improving the utilization efficiency of network resources. According to one aspect of the invention, a method for QoE management for a network service provided to a user device, the method comprising: displaying a user interface on the user device for a user to input an expected QoE value of the network service; receiving the expected QoE value of the network service from the user; evaluating an objective QoE value of the network service as a function of network QoS parameters; and adjusting the QoS parameters of the network service if the objective QoE value is less than the expected QoE value.

10 Claims, 8 Drawing Sheets

(51) Int. Cl.
*H04L 12/923* (2013.01)
*H04L 12/927* (2013.01)
*H04L 12/26* (2006.01)

(52) U.S. Cl.
CPC ........ *H04L 41/5067* (2013.01); *H04L 47/762* (2013.01); *H04L 47/805* (2013.01); *H04L 41/22* (2013.01); *H04L 41/509* (2013.01); *H04L 43/0829* (2013.01); *H04L 43/0852* (2013.01); *H04L 43/0894* (2013.01)

(58) Field of Classification Search
USPC ............... 370/229–235, 236–236.2, 252; 709/217–219, 223–226, 230–232
See application file for complete search history.

(56) References Cited

U.S. PATENT DOCUMENTS

| | | | |
|---|---|---|---|
| 2005/0047333 | A1 | 3/2005 | Todd et al. |
| 2007/0127509 | A1 | 6/2007 | Lin |
| 2007/0248100 | A1 | 10/2007 | Zuberi et al. |
| 2008/0104228 | A1* | 5/2008 | Dacosta .................. H04L 67/36 709/224 |
| 2008/0155087 | A1 | 6/2008 | Blouin et al. |
| 2010/0008224 | A1 | 1/2010 | Lyonnet et al. |
| 2010/0131650 | A1* | 5/2010 | Pok et al. ...................... 709/226 |
| 2011/0243553 | A1* | 10/2011 | Russell ........................... 398/25 |

FOREIGN PATENT DOCUMENTS

| | | |
|---|---|---|
| CN | 101621351 | 1/2010 |
| EP | 1865673 | 12/2007 |
| EP | 2154647 | 2/2010 |
| EP | 2290894 | 3/2011 |
| FI | 20021698 | 9/2002 |
| JP | 2004274552 | 9/2004 |
| JP | 20100500837 | 1/2010 |
| JP | 2010136257 | 6/2010 |
| WO | WO2001/89163 | 11/2001 |
| WO | WO2003/045028 | 5/2003 |
| WO | WO2006/002597 | 1/2006 |
| WO | WO2009049676 | 4/2009 |
| WO | 2010000168 | 1/2010 |

OTHER PUBLICATIONS

Chen et al, "Adaptive QoS Management in Heterogeneous Home Network Applications" Department of Information Management, National Taitung University, Taitung Taiwan, pp. 271-272.

Kanada, "Prototype Development of a Network Control Mechanism That Satisfies Requests on User-Level Communication Quality", Institute of Electronics Information and Communication Engineers Technical Report, May 2009, pp. 25-30. English Abstract.

* cited by examiner

| Service ID | MOS value |
|---|---|

Fig.7

METHOD AND APPARATUS FOR QUALITY OF EXPERIENCE MANAGEMENT FOR NETWORK SERVICES

This application claims the benefit, under 35 U.S.C. § 365 of International Application PCT/CN2010/001732, filed Nov. 1, 2010, which was published in accordance with PCT Article 21(2) on May 10, 2012 in English.

FIELD OF THE INVENTION

The present invention relates generally to network technology, in particular, to a method and an apparatus for QoE (Quality of Experience) management for network services.

BACKGROUND OF THE INVENTION

In order to achieve a robust video delivery over Internet and error-prone wireless networks under the constraint of limited bandwidth, Quality of Service (QoS) provisioning techniques have been proposed, ranging from MAC layer (e.g. ARQ and hybrid ARQ in WiMAX network) to application layer (e.g., error-resilient video coding in H.264). Normally, these QoS provisioning techniques will be helpful to improve the experience of an end user on a video service, so long as they can guarantee a certain QoS performance level which can be measured by QoS metrics, such as packet loss rate, delay, available bandwidth, etc.

However, QoS is only a metric of network performance but not equal to the Quality of Experience (QoE) of the video service observed by an end user, which is considered to be the ultimate goal from a service provider's point of view. Video QoE depends on not only network performance but also specific video applications and a viewer's vision system. For example, at a packet loss rate of 1%, the perceived video quality is still good for some video contents with lower motion activities, while the visible artefact in this case will be annoying for some other video contents with higher motion activities. Therefore, QoS adjustment is not always effective for QoE management of the video service.

In addition, once a video system is designed for a target QoS for certain applications, the system performance and adopted QoS provisioning techniques are fixed. User can do nothing to control the quality of the received video service even if the perceived quality of interested video program is not satisfactory. The target QoS level is generally designed according to the worst channel condition in order to guarantee consistent good video QoE, which can be a waste of network resources. Although the technical problem of the conventional art is explained with regard to the video service, a person skilled in the art can appreciate that other network services have the same disadvantage.

Finally, in a home network, there may be several running applications, e.g. file downloading, TV programs streaming and web browsing, etc. When these applications compete for resources and adopt independent techniques to improve their respective QoS, an even worse network deterioration might be generated, which in turn will lead to an even worse QoE for end users. Again, users can do nothing about the QoE degradation.

SUMMARY OF THE INVENTION

In view of the above, a QoE (Quality of Experience) management solution is provided, wherein QoE feedback is used to optimize the usage of QoS provisioning techniques, thus improving the utilization efficiency of network resources.

According to one aspect of the invention, a method for QoE management for a network service provided to a user device, the method comprising:
displaying a user interface on the user device for a user to input an expected QoE value of the network service;
receiving the expected QoE value of the network service from the user;
evaluating an objective QoE value of the network service as a function of network QoS parameters; and
adjusting the QoS parameters of the network service if the objective QoE value is less than the expected QoE value.

According to another aspect of the invention, a gateway for connecting a service provider network and a home network having at least one user device receiving a network service provided from the service provider network, comprising
a first unit adapted for evaluating an objective QoE value of the network service as a function of network QoS parameters; and
a second unit adapted for adjusting the QoS parameters of the network service if the objective QoE value is less than an expected QoE value inputted by an end user of the network service.

BRIEF DESCRIPTION OF DRAWINGS

These and other aspects, features and advantages of the present invention will become apparent from the following description in connection with the accompanying drawings in which:

FIG. 7 is an exemplary diagram showing the frame structure of the QoE request message according to an embodiment of the present invention.

DETAIL DESCRIPTION OF PREFERRED EMBODIMENTS

In the following description, various aspects of an embodiment of the present invention will be described. For purposes of explanation, specific configurations and details are set forth in order to provide a thorough understanding.

However, it will also be apparent to one skilled in the art that the present invention may be practiced without the specific details present herein.

Figure 1:
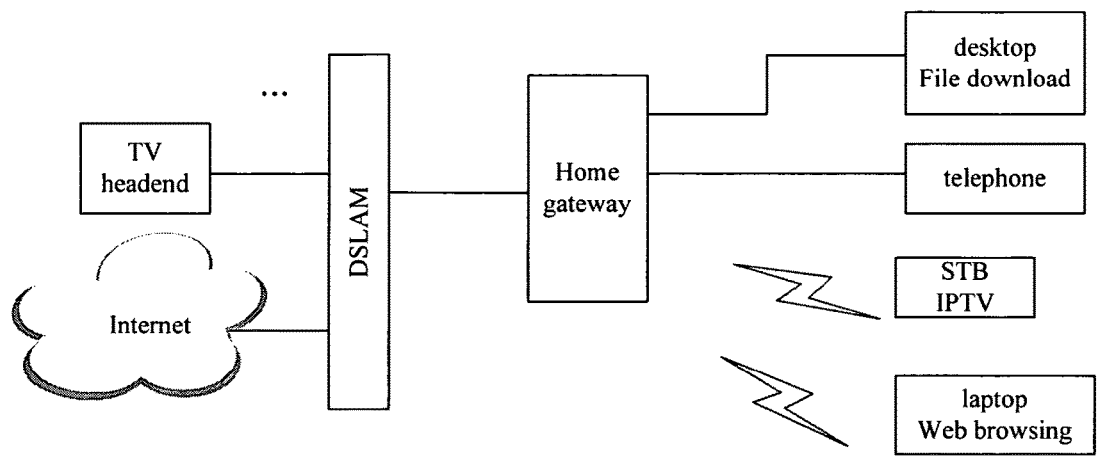
FIG. 1 is an exemplary diagram showing the general structure of a conventional triple-play home network.

FIG. 1 is an exemplary diagram showing the general structure of a conventional triple-play home network. As shown in FIG. 1, home devices, such as desktop, telephone, TV set (STB) and laptop, are connected to a home gateway via wired line or wireless interface (e.g. IEEE 802.11). The home gateway can be connected to a TV headend or Internet via, for example, DSLAM (Digital Subscriber Line Access Multiplexer). There may be several services running on the home network, including but not limited to file downloading, IPTV and web browsing. Traditionally, an end user can do nothing with the QoE of these received network services.

In view of the above-described technical problem, an embodiment of the invention provides a QoE management method and system of network services in a home network. According to one aspect of the embodiment, a QoE management unit is provided which can present a user interactive interface for an end user to assess the QoE of a network service. For example, via the user interactive interface, the end user can input his/her expected QoE requirements for respective network services, and prioritize his/her QoE requirements for applications if the previous QoE requirements cannot be satisfied by the underlying network technologies. According to another aspect of the framework, a QoS adjustment unit is provided. The QoS adjustment unit can receive an expected QoE requirement from the QoE management unit, based on which to optimize the usage of underlying QoS provisioning modules to obtain a better overall QoE performance.

Next, a detailed description of the operation of an embodiment of the QoE management method and system for the home network shown in FIG. 1 will be provided with reference to the accompanied figures.

Figure 2A:
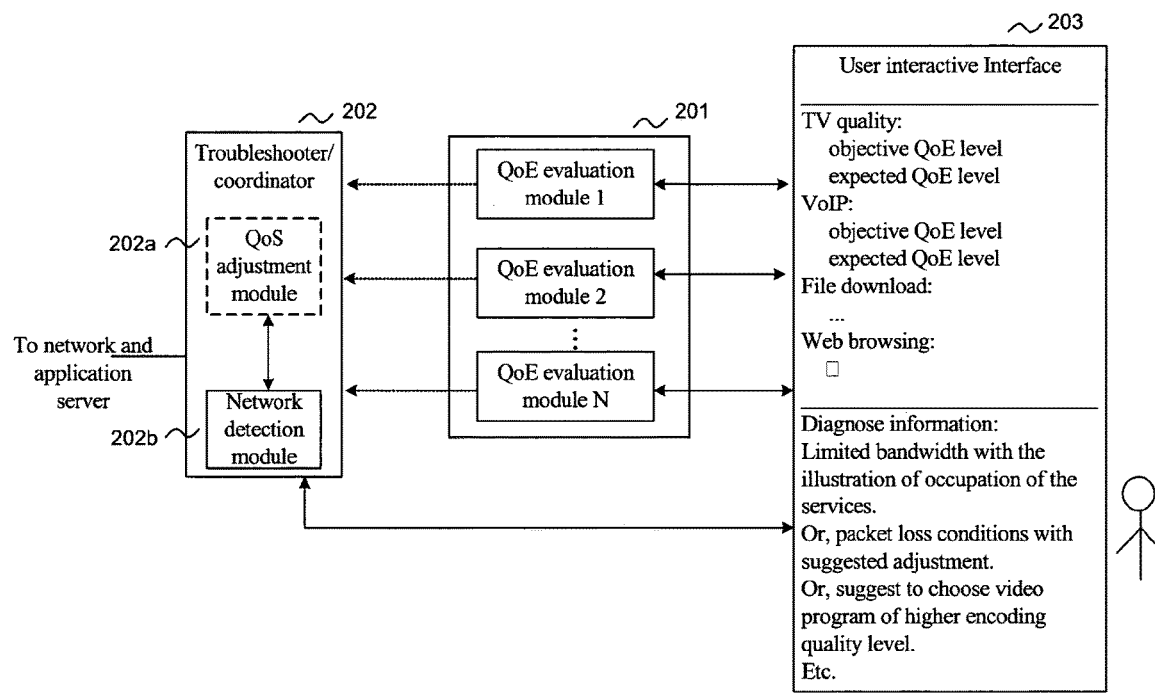
FIG. 2a is a block diagram showing the structure of a QoE management system according to an embodiment of the invention.

FIG. 2a is a block diagram showing the structure of a QoE management system according to an embodiment of the invention. As shown in FIG. 2a, the QoE management system comprises a QoE management unit 201 and a coordinator (or called troubleshooter) unit 202.

The QoE management unit 201 can present a user interactive interface 203, on anyone or more of the home devices, to allow the user to input his/her expected QoE level for a network service. The user interactive interface 203 can be displayed in any appropriate manner on one or more of the home devices. It provides a QoE management page for some or all of the network services over the home network, whereby the user is allowed to input his/her expected QoE level for each service.

As shown in FIG. 2a, the QoE management unit 201 comprises a plurality of QoE evaluation modules 1-N which correspond respectively to various network services over the network, such as TV, VoIP (Voice over IP), file downloading, web browsing, etc. Each QoE evaluation module can receive the expected QoE level of the network service input by the user via the user interactive interface and transmit it to the coordinator unit 202.

As shown in FIG. 2a, the coordinator unit 202 comprises a QoS adjustment unit 202a and a network condition detection module 202b. The network condition detection module 202b measures network QoS metrics, such as packet loss rate, delay and available bandwidth, and provides these metrics to the QoS adjustment unit 202a. The QoS adjustment unit 202a can generate an objective QoE level of a network service based on the QoS metrics, and determine whether an adjustment to QoS provisioning techniques is needed according to whether the objective QoE level is less than the received expected QoE level.

Figure 2B:
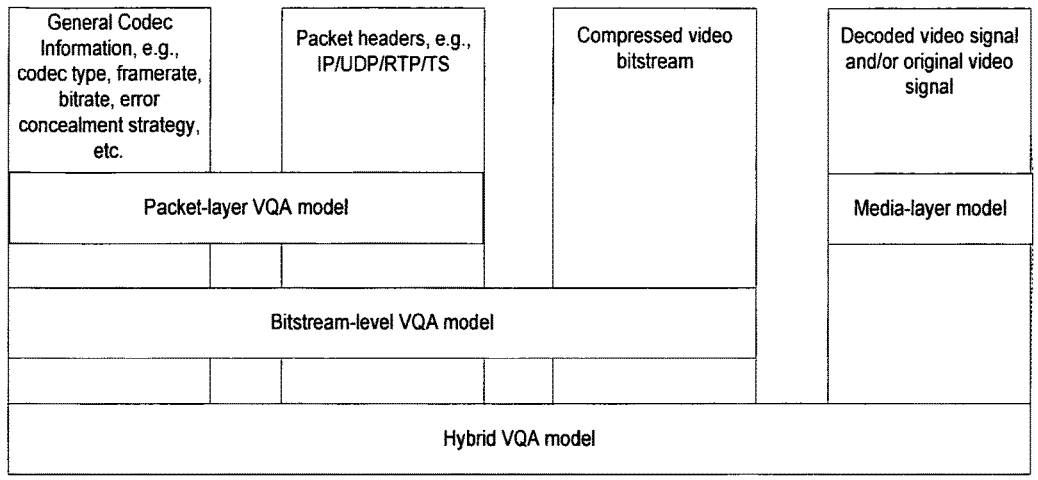
FIG. 2b is an exemplary diagram showing different types of method for generating the objective QoE level.

The above-described objective QoE level can be generated by known methods. FIG. 2b is an exemplary diagram showing different types of VQA (Visual Quality Assessment) method for generating the objective QoE level. Depending on the inputs, the method for generating the objective QoE level can be classified as packet-layer model, bitstream-level model, media-layer model and hybrid model as shown in FIG. 2b. Media-layer model works with picture signal, which therefore is able to obtain content dependent features of the video quality but does not have explicit knowledge of lost parts of picture. For example, in H. Rui, C. Li, S. Qiu, "Evaluation of packet loss impairment on streaming video", Journal of Zhejiang University-Science A, 7(0), 131-136, (2006), an algorithm is designed to detect the error area using the assumption that strong spatial discontinuities are hints of loss. Packet-layer model, for example the solution disclosed by Kazuhisa Yamagishi, Takanori Hayashi, "video-quality planning model for videophone services," Information and Media Technologies 4(1): 1-9 (2009), is based on packet network protocol header information, network parameters (e.g. bandwidth, packet loss rate, delay, etc.), and codec configuration information. Obviously this model is video content agnostic, but has full knowledge of transmission errors. A. R. Reibman, V. A. Vaishampayan, Y. Sermadevi, "Quality monitoring of video over a packet network", IEEE Trans. on Multimedia, 6(2), 327-334, (2004) describes one example of the Bitstream-level model, which is based on bitstream and packet headers as well. Thus it not only is aware of transmission errors by analyzing packet header information, but also has access to video content feature and more detailed encoding parameters by partially decoding the video bitstream. Hybrid model uses the combination of picture signals and the packet header and bitstream information to predict video quality to improve prediction accuracy but at a cost of higher computational complexity.

As a variant, the coordinator unit 202 can also transmit the generated objective QoE level to the QoE management unit 201 that can display the objective QoE level of a network service to the user in the user interactive interface. Please note that the display of the objective QoE level is not necessary for the user to input his/her expected QoE level for a network service. But more relevant information on QoE might be helpful for a user to manage the QoE of network services via the user interactive interface. Furthermore, the user interactive interface can also display diagnose information received from coordinator unit 201, which allows the user to prioritize his QoE requirements for the services, in case that the underlying network cannot simultaneously satisfy all QoE requirements of users.

The QoE management unit 201 and the coordinator unit 202 can physically reside in a same device, for example, a client device, a home gateway or a server.

The QoE management unit 201 and the coordinator unit 202 can also physically reside in different devices. In this case, as an example, the QoE management unit 201 can physically reside in a client device, for example, a STB. As described above, the QoE management unit 201 can present a QoE management page for a user to input his/her expected QoE level for each service and transmit the expected QoE level to the coordinator unit 202. The expected QoE level can be used by the coordinator unit 202 as the predefined triggering threshold for QoS provisioning technology adjustment. The coordinator unit 202 can physically reside in a home gateway. When triggered by a certain condition determined, for example, by the above described objective QoE level and expected QoE level of a service, the coordinator unit 202 will adjust and optimize the underlying QoS provisioning techniques. The coordinator unit 202 may also send diagnose information to the QoE management unit 201 for presenting on the QoE management page to facilitate the end user to make a choice or prioritize his/her QoE requirements for different services.

As described above, a person skilled in the art can appreciate that the coordinator unit 202 installed in the home gateway can also measure the service QoE at the point where the service arrives at home gateway from outside network, while the QoE management unit 201 installed at the client device can measure the QoE of a service input by the end user. In this case, in the home network shown in FIG. 1, only QoE degradation due to in-home network issues is taken into consideration regarding the adjustment/optimization of QoS provisioning techniques. For QoE degradation not caused by the network, for example, because of the source of the service, the home gateway will not try to adjust the QoS provisioning technology. For example, in a case that the objective QoE level measured for a TV program is lower than the expected QoE level requested by user, the home gateway will send diagnose information to suggest the user choosing another TV program with higher video quality or send request on behalf of the end user to application server for another coded stream with higher compression quality, instead of adjusting the QoS techniques in the home network.

Next, an operation of the QoE evaluation module 1 of the QoE management unit 201 for IPTV service will be described as an example. It can be appreciated by a person skilled in the art that the other QoE evaluation modules are similar in this respect.

The QoE evaluation module 1 (e.g. the video model defined in ITU-T P.NAMS), which may exist in a set-top-box (STB), can present the user interactive interface 203 on a TV screen for a user to input his/her expected QoE level for a TV program.

Figure 3:
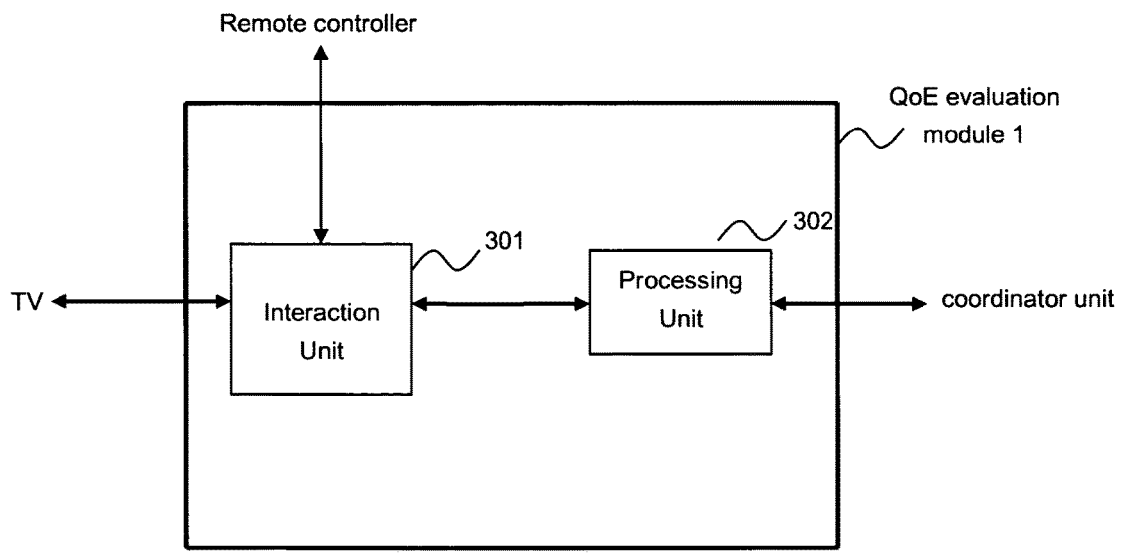
FIG. 3 is a block diagram showing the structure of the UI module in the STB according to an embodiment of the invention.

FIG. 3 is a block diagram showing the structure of the QoE evaluation module 1 according to an embodiment of the invention. As shown in FIG. 3, the QoE evaluation module 1 comprises an interaction unit 301 for presenting the QoE management page on a TV screen and for capturing user's input on the expected QoE levels of IPTV service. The QoE evaluation module 1 further comprises a processing unit 302 for receiving the expected QoE input from the interaction unit 301 and transmitting a QoE request message to inform coordinator unit 202 of the user's QoE requirements for the video service.

Figure 4:
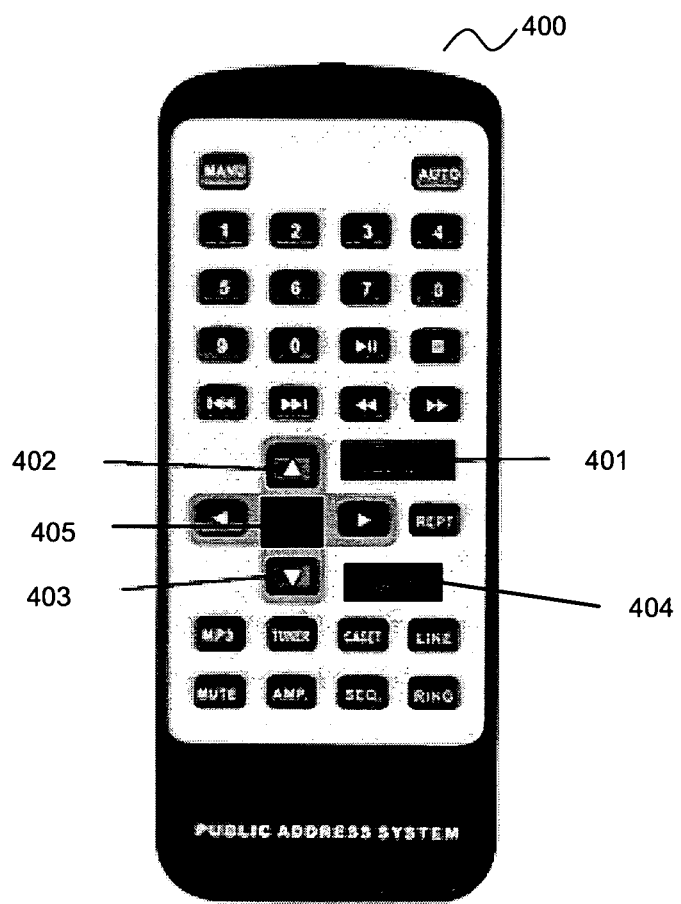
FIG. 4 is an exemplary diagram showing TV remote controller for the QoE management information displaying and QoE request input according to an embodiment of the present invention.

As an example, a TV remote controller 400 as shown in FIG. 4 can be used for the user to activate and implement the QoE management function, including inputting his/her expected QoE levels of services, such as QoE level of video quality. The remote controller 400 is provided with a "QoE" button 401 on the panel for the user to activate the QoE evaluation module 1. After the "QoE" button 401 is pressed, a user interactive interface will be displayed on the TV screen. As an example, the user interactive interface can be a QoE management page 503a as shown by FIG. 5.

Figure 5:
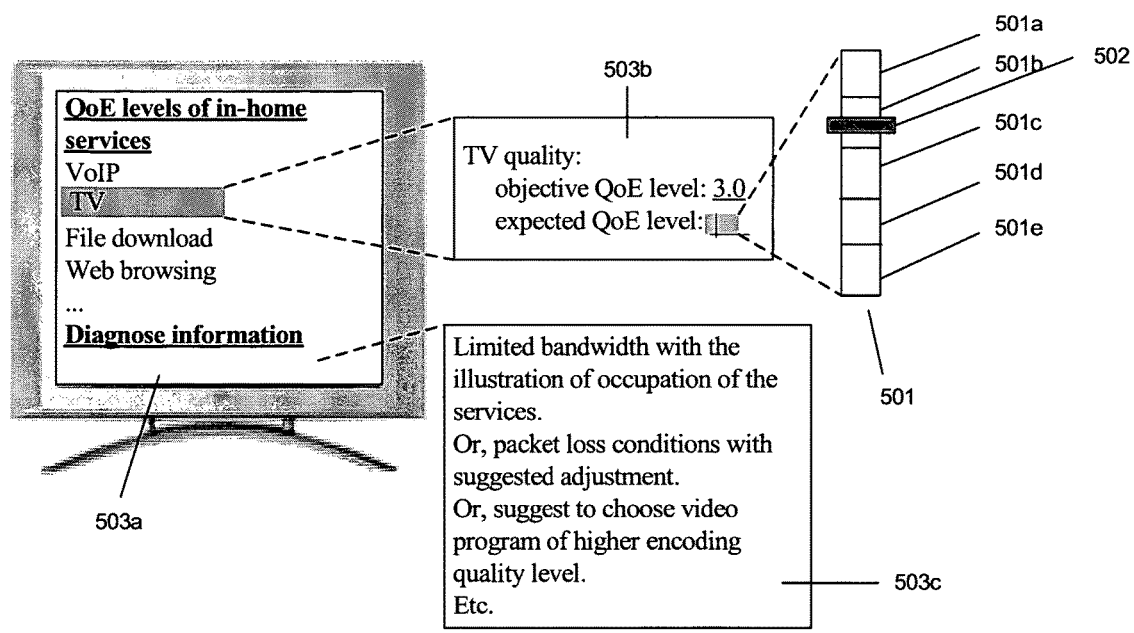
FIG. 5 is an exemplary diagram showing a UI for the QoE management according to an embodiment of the present invention.

As show in FIG. 5, the QoE management page 503a lists the QoE management information of all or part of the in-home video services in the home network, including but not limited to VoIP, TV, file downloading, web browsing. For each video service, the QoE management information may comprise two categories of information, that is, QoE level and diagnose information. The user can move the cursor via "UP-ARROW" button 402 or "DOWN-ARROW" button 403 of the remote controller 400 to select interested video services. FIG. 5 shows an example when the QoE level of the TV service is selected for illustrative purpose. When the cursor is moved to the TV service under the QoE level item, another QoE management page 503b for TV service is displayed. The QoE management page 503b presents an objective QoE level of the TV service that may be provided from the coordinator unit 202 and a blank field for the user to input his/her expected QoE level of the TV service. As shown in FIG. 5, the objective QoE level is 3.0 and can changes in accordance with the value received from the coordinator unit 202.

When the user moves cursor via "UP-ARROW" button 402 or "DOWN-ARROW" button 403 of the remote controller 400 to the blank field of expected QoE level, a quality-colour-bar 501 is shown. The quality-colour-bar 501 comprises a plurality of (for example, five as shown in FIG. 5) colour bands with different colours representing respectively expected quality level for the user to choose. For example, the quality-colour-bar 501 comprises light green, light blue, yellow, orange and red colour bands 501a, 501b, 501c, 501d and 501e representing respectively different levels of subjective perception of quality degradation: "5: imperceptible", "4: perceptible but not annoying", "3: slight annoying", "2: annoying" and "1: very annoying" in a quality descending order. The values of the objective QoE level may have the same meaning as those of quality-colour-bar.

The end-user can press "UP-ARROW" button 402 or "DOWN-ARROW" button 403 of the remote controller 400, as shown in FIG. 4, to move the quality-block 502 through the colour bands 501a, 501b, 501c, 501d and 501e to select the corresponding quality level and then press "OK" button 405 to confirm the input of his/her expected QoE level of the TV service. As shown in FIG. 5, when the quality-block 502 stays at the colour band 501b, prompt information ("4: perceptible but not annoying" in this case) on the quality level represented by this colour band will be displayed to facilitate the user's operation. User can return to the immediately previous QoE management page by pressing the "Return" button 404 on the controller.

When the user moves the cursor, via "UP-ARROW" button 402 or "DOWN-ARROW" button 403 of the remote controller 400, to the diagnose information, another QoE management page 503c will be displayed. The diagnose information may be generated by the coordinator unit 202, for example, when all of the user's QoE requests cannot be satisfied. In an example, the diagnose information may indicate limited bandwidth with the illustration of the occupied bandwidth of each service; or indicate packet loss rates with suggested adjustment; or indicate that the QoE level of a video service cannot be satisfied unless the user choose another video program of higher encoding quality level. An embodiment of processing of the coordinator unit 202 will be described later.

When user confirmed his choice of expected QoE level of a video service by pressing "OK" button 405, he/she can exit the QoE management page by pressing the "Return" button 404 at the status of the QoE management page 503a.

It can be appreciated by a person skilled in the art that the above-described QoE management page is only an illustrative example and other kinds of QoE management pages can be designed and used.

Figure 6:
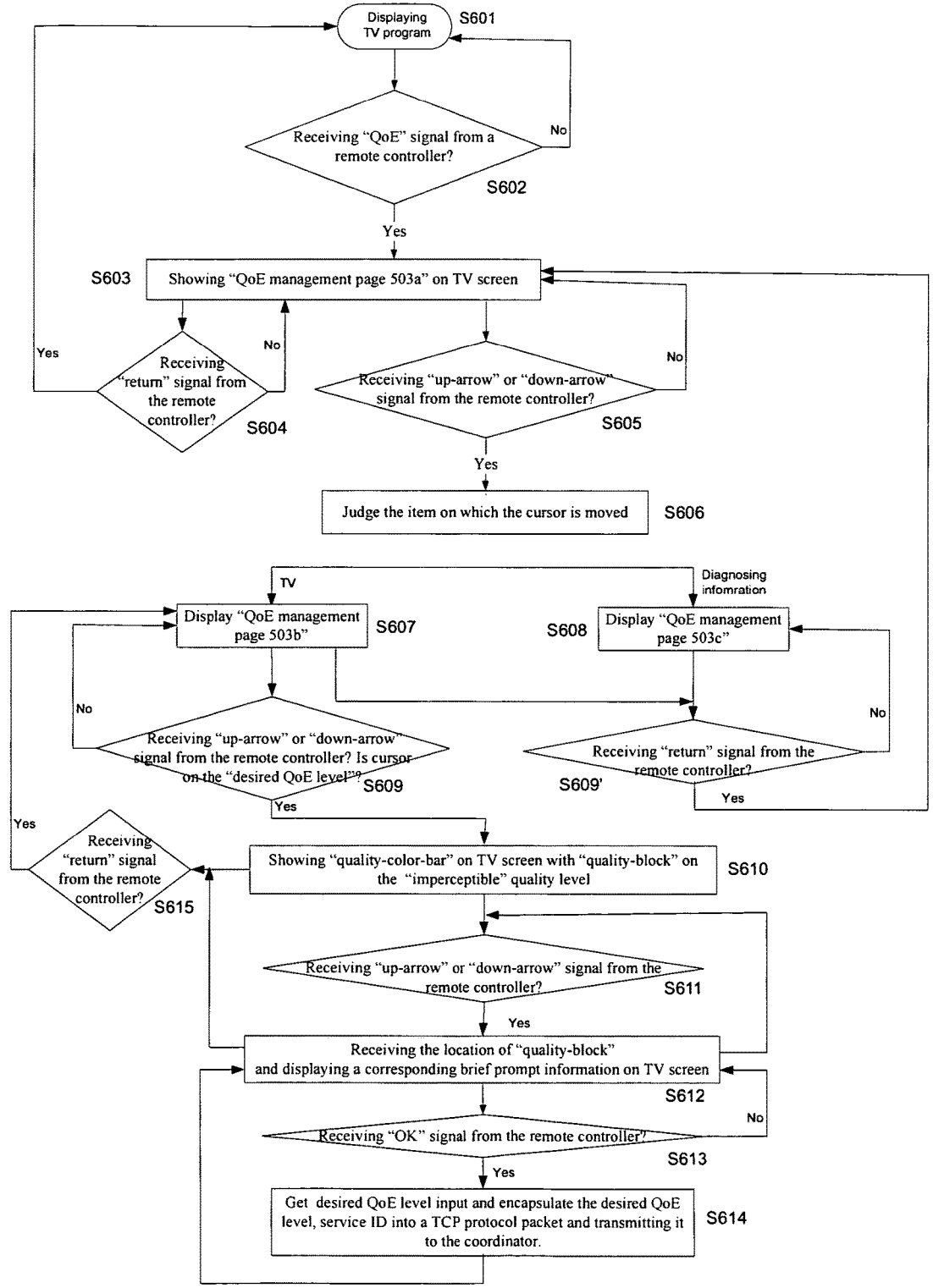
FIG. 6 is a flow chart showing the workflow of the UI module 300 for the example of FIGS. 4 and 5 according to an embodiment of the present invention.

FIG. 6 is a flow chart showing the workflow of the QoE evaluation module 1 described with reference to FIGS. 4 and 5.

As shown in FIG. 6, at step S601, a TV program is displayed on the TV screen.

At the following step S602, the interaction unit 301 of the QoE evaluation module 1 detects whether a "QoE" signal, which represents the "QoE" button 401 of the remote controller 400 was pressed by the user, is received from the remote controller 400. If the result is "Yes", then the procedure proceeds to step S603, wherein the interaction unit 301 will display a QoE management page on the TV screen. For example, the QoE management page 503a as shown in FIG. 5 can be displayed on the TV screen. Then the interaction unit 301 will wait for the input of the user. If at the following step S604 the interaction unit 301 receives the "Return" signal, which represents the "Return" button 404 of the remote controller 400 was pressed by the user, the procedure will return to the step S601. If no "Return" signal is received, the interaction unit 301 will keep on waiting for the input of the user.

If at the step S605 the interaction unit 301 receives "UP-ARROW" signal or "DOWN-ARROW" signal from the remote controller 400, the procedure will proceed to the following step S606 to judge where the cursor is moved on the QoE management page 503a. If the cursor is moved to the "TV" item of QoE level, then at step S607 the corresponding QoE management page will be displayed on the TV screen. For example, the QoE management page 503b shown in FIG. 4 can be displayed. A person skilled in art can appreciate that if the cursor is on other services, corresponding QoE management pages similar to 503b will be displayed. If the cursor is moved to the "diagnose information", then at step S608 the corresponding QoE management page will be displayed on the TV screen. For example, the QoE management page 503c shown in FIG. 4 can be displayed. The following procedure will be described in a case that the QoE management pages 503b and 503c are used.

On the QoE management page 503b, the objective QoE level is shown under the item "objective QoE level" in real-time.

As shown in FIG. 6, the interaction unit 301 will receive "UP-ARROW" signal or "DOWN-ARROW" signal from the remote controller 400 and determine whether the cursor is moved onto the "expected QoE level". If the result is "Yes", then at step S610 a "quality-colour-bar" 501 with "quality-block" 502 on the default quality degradation level 501a and a corresponding brief prompt information of "imperceptible" are displayed. If a "Return" signal is received at S609' after the step S607 or S608, the procedure will return to the step S603 to display the QoE management page on the TV screen.

Figure 7:
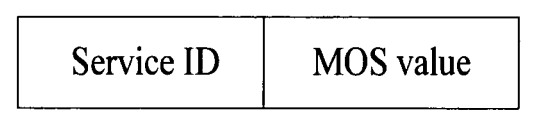

At the following step S611, the interaction unit 301 will determine whether "UP-ARROW" signal or "DOWN-ARROW" signal is received from the remote controller 400. If the result is "Yes", at the step S612 the quality-block 502 will be moved correspondingly through the colour bands 501a, 501b, 501c, 501d and 501e on the TV screen, and corresponding prompt information will be displayed when the quality-block 502 is locating at one of the colour bands. At the following step S613, if the interaction unit 301 receives "OK" signal, which represents the "OK" button 405 of the remote controller 400 was pressed by the user, it gets the expected QoE level input from the user and then displays the input value beside the "expected QoE level" of page 503b on the screen. The QoE level input can be transmitted to the processing unit 302 which can encapsulate the QoE level input with "service ID" into a TCP (Transmission Control Protocol) packet and transmits the packet as a QoE request message to the coordinator unit 202. An example of the frame structure of the QoE request message is shown in FIG. 7. As shown in FIG. 7, the expected QoE level input is in the form of a MOS value. Other frame structures can also be used.

As shown in FIG. 6, if at the step S615 a "Return" signal from the remote controller 400 is received by the interaction unit 301, the procedure will return to the step S607 to display the QoE management page 503b.

Figure 8:
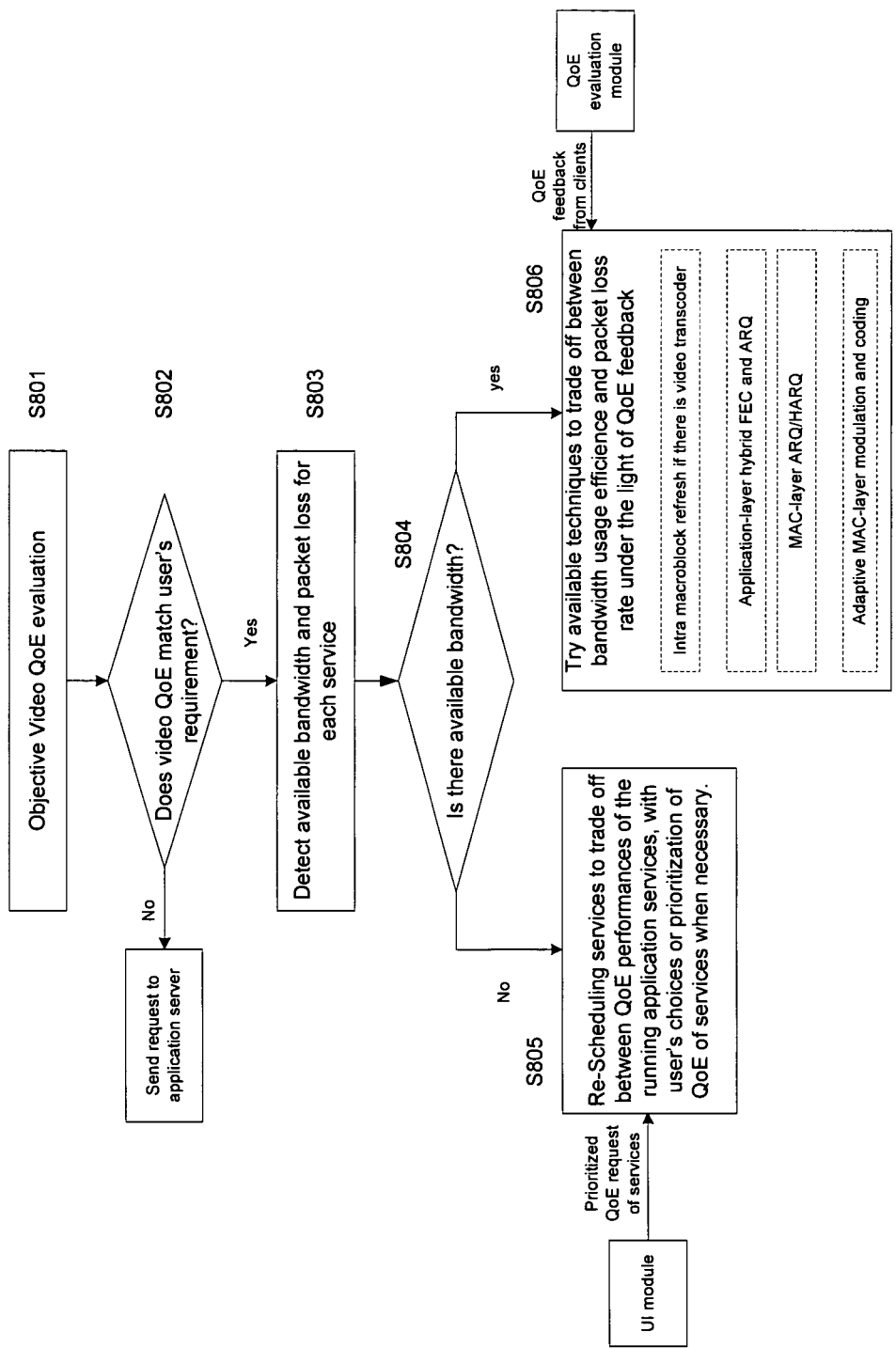
FIG. 8 is a flow chart showing the workflow of the coordinator unit according to an embodiment of the present invention.

FIG. 8 is a flow chart showing the workflow of the coordinator unit 202. At step S801, the network condition detection module 202b obtains an objective QoE level of the video service perceived at the point of home gateway on which the coordinator unit 202 is physically implemented. The objective QoE level can be obtained by measuring QoS parameters and/or by scanning a video bitstream.

At the next step S802, the QoE adjustment module 202a determines whether the objective QoE level of the video service coming from outside home network is less than the expected QoE level of the user. If the result of the step S802 is "No", the QoE adjustment module 202a will send request to application server for another coded stream with higher compression quality. If the result of S802 is "Yes", at the next step S803 the QoE adjustment module 202a will instruct the network condition detection module 201c to detect the available bandwidth of each service in the home network and packet loss rate. By the mentioned "the objective QoE level of the video service coming from outside home network", it means the objective QoE measured based on the upstream network condition and the compressed video quality at the output of the video server e.g., TV headend. According to the step S802, it was determined whether the QoE degradation of video service was caused before the video enters the home network. If yes, the quality degradation problem should not be handled within the home network.

At step S804, the QoE adjustment module 202a will determine whether the available bandwidth is enough to satisfy the QoE requirements of all running services on the home network based on the detection result of the step S803. If the result of step S804 is "No", at step S805 the QoE adjustment module 202a will reschedule services to tradeoff the QoE performances of the running application services, with user's choices or prioritization of the expected QoE levels of services, when necessary. If the result of S804 is "Yes", at step S806 the QoE adjustment module 202a will iteratively optimize the available QoS provisioning techniques (e.g., adaptive modulation and coding, application-layer hybrid FEC and ARQ, Intra macroblock refresh if there is a video transcoder) according to the expected QoE level transmitted from the QoE management unit 201 installed at client device, when the objective QoE level does not match the expected QoE level (that is, whether the objective QoE level is less than the expected QoE level).

The existing QoS provisioning techniques range from physical (PHY) layer to application layer, including for example, the adaptive modulation and coding technique at PHY layer, MAC-layer ARQ (automatic retransmission request)/Hybrid ARQ in Wimax wireless access network, application-layer hybrid FEC and ARQ, and error-resilience video coding tools like Intra Macroblock refresh if a video transcoder exists on the home gateway. These QoS provisioning techniques can be used alone or jointly in a cross-layer optimization manner. In a simple example, when the QoS adjustment is triggered, at the PHY layer, the modulation & coding scheme (MCS) level is increased gradually and iteratively to improve the robustness to transmission error but at a cost of system resource consumption until the objective QoE level satisfies the expected QoE. In a more advanced cross-layer QoS optimization, iterative search for optimum combination of QoS provision techniques at different layers can be performed until the objective QoE level satisfies the expected QoE.

It is to be understood that numerous modifications may be made to the illustrative embodiments and that other arrangements may be devised without departing from the spirit and scope of the present invention as defined by the appended claims.

The invention claimed is:

1. A method for Quality of Experience (QoE) management of a network service provided to a device over a network, the method comprising:
    generating, by a coordinator, an objective QoE value for the network service observed at the device as a function of Quality of Service (QoS) parameters of the network service;
    providing, by a QoE management device, an interface for display at the device, the interface including a plurality of symbols and the objective QoE value generated by the coordinator, each of said plurality of symbols corresponding to a selectable QoE level, each selectable QoE level representing an expected QoE value for the network service observed at the device;
    receiving, by the QoE management device, a selection of one of the plurality of symbols as the expected QoE value for the network service at the device; and
    transmitting the selected expected QoE value to the coordinator for use in adjusting at least one of the QoS parameters of the network service in response to determining that the generated objective QoE value is less than the received expected QoE value for the network service observed at the device.

2. The method according to claim 1, wherein the QoS parameters of the network service comprise packet loss rate, available bandwidth and delay.

3. The method according to claim 1, wherein the network service comprises file downloading, video streaming and web browsing.

4. The method according to claim 1, further comprising: adjusting the QoS parameters of the network service within or out of the network based on whether the objective QoE value of the network service is evaluated within or out of the network.

5. An apparatus for connecting a service provider network and a home network having at least one device receiving a network service provided from the service provider network, comprising a Quality of Experience (QoE) management device including at least one processor, each at least one processor being associated with a respective at least one device for providing an interface for display at the respective at least one device and receiving an expected QoE value for the network service observed at the at least one device, the interface providing a plurality of symbols and an objective QoE value for display at the respective at least one device, each of said plurality of symbols corresponding to a selectable QoE level representing a respective expected QoE value for the network service observed at the respective at least one device enabling selection of one of the plurality of symbols as the expected QoE value at the respective at least one device for the network service; and a coordinator having an input coupled to the service provider network and a processor that measures Quality of Service (QoS) parameters of the service provider network wherein the processor generates the objective QoE value for the network service observed at the at least one device as a function of the QoS parameters of the service provider network and receives the selected expected QoE value from the QoE management device for use in adjusting at least one of the QoS parameters of the service provider network in response to determining that the objective QoE value is less than the expected QoE value for the network service observed at the at least one device.

6. The apparatus according to claim 5, wherein the expected QoE value is transmitted from the at least one user device.

7. The apparatus according to claim 5, wherein the apparatus is a gateway.

8. The apparatus according to claim 5, wherein the QoS parameters of the network service comprise packet loss rate, available bandwidth and delay.

9. The apparatus according to claim 5, wherein the network service comprises file downloading, video streaming and web browsing.

10. The apparatus according to claim 5, wherein the QoS parameters of the network service within or out of the network based on whether the objective QoE value of the network service is evaluated within or out of the network are adjusted by an adjustment unit.

* * * * *